United States Patent
Noel et al.

[19]

[11] Patent Number: 5,904,965
[45] Date of Patent: May 18, 1999

[54] SYNTHETIC CLOSURE

[75] Inventors: Gert Noel, Hauset, Belgium; Eduardo Lauer, Zebulon, N.C.

[73] Assignee: Nomaco, Inc., Zebulon, N.C.

[21] Appl. No.: 08/932,333

[22] Filed: Sep. 17, 1997

Related U.S. Application Data

[63] Continuation-in-part of application No. 08/842,496, Apr. 24, 1997.

[51] Int. Cl.$^6$ .............................. B29D 22/00; B32B 3/02; B32B 3/26; B32B 27/00
[52] U.S. Cl. ...................... 428/36.5; 428/35.7; 428/36.8; 428/66.3; 428/66.4; 428/316.6; 428/319.3; 428/908.8; 428/515; 215/355; 215/358; 215/364; 264/54; 521/140
[58] Field of Search ..................................... 215/355, 358, 215/364; 428/35.7, 36.5, 36.8, 66.4, 515, 66.3, 316.6, 318.4, 318.6, 319.3, 319.7, 319.9, 908.8; 264/54; 521/140

[56] References Cited

U.S. PATENT DOCUMENTS

| | | | |
|---|---|---|---|
| 4,091,136 | 5/1978 | O'Brien et al. ........................... | 428/141 |
| 4,363,849 | 12/1982 | Paisley et al. ........................ | 428/318.8 |
| 4,499,141 | 2/1985 | Paisley et al. ........................ | 428/318.8 |
| 4,507,405 | 3/1985 | Paisely et al. .......................... | 521/84.1 |
| 4,522,856 | 6/1985 | Paisley et al. ............................. | 428/64 |
| 5,360,048 | 11/1994 | Lauer ............................................. | 156/86 |
| 5,480,915 | 1/1996 | Burns ........................................ | 521/50 |
| 5,496,862 | 3/1996 | Burns ........................................ | 521/50 |
| 5,665,462 | 9/1997 | Dewar ...................................... | 428/220 |
| 5,710,184 | 1/1998 | Burns ........................................ | 521/50 |
| 5,723,507 | 3/1998 | Markovich et al. ....................... | 521/51 |

*Primary Examiner*—Ellis Robinson
*Assistant Examiner*—Jennifer M. Hayes
*Attorney, Agent, or Firm*—Melvin I. Stoltz

[57] ABSTRACT

By achieving an extruded, foamed core formed from plastic material peripherally surrounded and integrally bonded with a cooperating synthetic, plastic, extruded, outer layer, a unique, multi-component, multi-layer synthetic closure is provided which may be employed as a bottle closure or stopper for any desired product, whether the product is a liquid, a viscous material, or a solid distributed in a bottle or container and dispensed through the open portal of the container neck. The present invention achieves a mass producible, resilient, synthetic bottle closure which is employable for any desired bottle, including wine. By employing the present invention, a multi-component or multi-layer synthetic closure is attained which possesses physical properties substantially equal to or better than the physical properties found in cork material, which has caused such cork material to be the principal closure material for wine bottles.

30 Claims, 1 Drawing Sheet

SYNTHETIC CLOSURE

RELATED APPLICATIONS

This application is a continuation-in-part of U.S. patent application Ser. No. 08/842,496, filed Apr. 24, 1997 for a Synthetic Closure.

TECHNICAL FIELD

This invention relates to closures or stoppers for containers containing liquids, low viscosity substrates, and small solids, and more particularly, to closures or stoppers formed from synthetic materials and employable as a bottle stopper for a container.

BACKGROUND ART

In view of the wide variety of products that are sold for being dispensed from containers, particularly containers with round necks which define the dispensing portal, numerous constructions have evolved for container stoppers or closure means for the portals. Generally, products such as vinegar, vegetable oils, laboratory liquids, detergents, honey, condiments, spices, alcoholic beverages, and the like, impose similar requirements on the type and construction of the closure means used for containers for these products. However, wine sold in bottles represents the most demanding product for bottle closure means, due to the numerous and burdensome requirements placed upon the closure means used for wine bottles. In view of these demands, most wine bottle closures or stoppers have been produced from a natural material known as "cork".

Although synthetic materials have been proposed for use as wine bottle stoppers or closures, such products have been unable to satisfy all of the stringent requirements. As a result, cork has remained the dominant material for wine closures, in spite of the numerous inherent problems that exist with cork.

Cork represents the bark of a particular variety of cork oak, quercus suber, a tree of the oak family characteristic of western Mediterranean countries, such as Portugal, Spain, Algeria, Morocco, France, Italy, and Tunisia, that has the ability to renew its bark indefinitely. Cork is a vegetable plant comprising tissue made up of dead microcells, generally 14-sided polyhedrons, slotting in one against the other, with the intercell space filled with a gaseous mixture, essentially atmospheric air but without the carbon dioxide. It is estimated that 1 $cm^3$ of cork numbers 15 to 40 million hexagonal cells with the thickness of the cellular membranes varying between 1 and 2.5 microns.

The suberose texture is not arranged in a uniform fashion. It is criss-crossed within its thickness by pores or ducts with walls more or less lignified, forming the lenticels. These are filled with powder of a reddish-brown color, rich in tannin. The lenticels are permeable to gases and liquids and they are often invaded by molds and other microorganisms.

The unevenness, both in membrane thickness and in the height and diameter of the cell forming the suberose parenchyma, can affect some of the cork's mechanical and physical properties, namely its compressibility and elasticity. The cork oak being able to keep its physiological process active at all times, the difference in cell size and the thickness of the cellular membrane between cork produced in spring and the succeeding autumn leave discernible rings showing the extent of each year's growth.

The contents of newly formed cells disappear during growth and the subsequent process of suberization of the membranes, on completion of which all communication with the plant's living tissues ceases. The uniqueness of quercus suber is the achieved thickness of cork bark, up to several centimeters, which insulates the tree from heat and loss of moisture and protects it from damage by animals.

In order to harvest the thick cork bark for the first time, the growth cycle takes between 20 and 30 years, depending on location, weather conditions etc. yielding the so-called virgin cork. Afterwards, some 10 years are needed between each harvest of cork boards or reproduction cork in order to gain the necessary length for some corks. Due to this process, the cork used for the manufacture of bottle closures is a reproduction of cork that is formed again after several barking phases.

The properties of cork derive naturally from the structure and chemical composition of the membranes. Because 89.7% of the tissue consists of gaseous matter, the density of cork is extremely low, about 120 to 200 $kg/m^3$, which makes the cork light and a good insulator. Density differences can be explained by the humidity differences, the age and quality of the cork bark and the cork tree and its growth differences. The cellular membranes are very flexible, rendering the cork both compressible and elastic. Elasticity enables it to rapidly recover to its original dimensions after any deformation. Its chemical composition gives the cork the property of repelling moisture. The walls of the cells are crusted with suberin, a complex mixture of fatty acids and heavy organic alcohols.

The value of cork is further increased by its low conductivity of heat, sound and vibration due to the gaseous elements sealed in tiny, impervious compartments. Cork is also remarkably resistant to wear and has a high friction coefficient, thanks to the honeycomb structure of the suberose surface. Cork does not absorb dust and consequently does not cause allergies nor pose a risk to asthma sufferers. It is fire resistant, recyclable, environmentally friendly and a renewable product.

These advantages have made natural cork the preferred bottle closure for wine storage, particularly for medium and high quality wines where tradition, the wine mystique and the bottle opening ritual with a corkscrew, are a very important, though intangible, aspect of the wine consumption. However, numerous disadvantages of natural cork also exists and derive naturally from the structure and chemical composition of the membranes.

Because cork is a natural product, it is a limited resource. Its limitations become even more obvious with the following facts: the natural growing of cork is geographically limited to the western Mediterranean countries; the world wide annual harvest of cork oak bark is 500,000 tons and can barely be increased, because of climatic and ecological reasons; and ten-year cycles are needed between each harvest of cork boards. In order to meet the rising worldwide cork demand, the pare cycles of cork have been shortened, leading to inferior qualities and constantly rising raw material prices.

The irregularities of the cork's structure due to geographic, climatic and ecological reasons causes many quality variances. This creates a complex categorization of qualities and standards. Through different types of washing processes, various chemical agents are combined in order to decontaminate the cork and to treat the appearance of the cork. High quality corks do not need washing. The cork quality is graded, based on the number of lenticels, horizontal and vertical cracks, their sizes, and other cork specific characteristics. The grading process is a subjective task based on statistically significant populations which is difficult to perform due to its natural origin, since every cork looks, feels, functions and smells different.

Wine market experts estimate that 1% to 5% of all bottled wine is spoiled by cork taint. At least six chemical compounds have been associated with cork taint in wines. Most frequently, 2,4,6-trichloranisole (TCA) is the major culprit responsible for the offensive off-odor and impact on the flavor of the wine. TCA has an extremely low threshold for odor detection. It is detectable at concentrations as low as 1 ppt or 1.0 nanogram per liter.

In most cases, cork taint does not involve the wine-making process. Typically, the tainting chemical is not found in vineyards or in parts of the winery where the wine is produced. After the wine is bottled, the defect shows itself, thus spoiling the wine. It is almost exclusively associated with corks.

Also, there is evidence that once the corks have been treated with chlorine, and are brought into interaction with mold fungus through humidity, chloranisole is created. Other types of wine spoilage are caused by oxidation, hydrogen sulfide, volatile acidity, sulfur dioxide, brettanomyces, and mercaptans.

Another problem commonly found with natural cork is leaking bottles. Typically, the lack of tightness between the cork and the neck of the bottle causes 10% to 20% of bottle leakage. However, the majority of wine leakage is caused by passage of the wine through the cork body. These problems are most often found with lower quality cork material, which is typically porous, too soft, out of round, or out of the predetermined specifications.

In view of the fact that wine spoilage is caused by oxidation of the wine, any gas exchange between ambient conditions and the interior of the wine bottle must be avoided. However, many corks are deformed by the chops or jaws of the bottle corking equipment, which enables air exchange and oxidation to occur. Furthermore, when bottles are stored in an environment where ideal humidity is not maintained, optimum functionality of the cork is not achieved and the cork loses its efficiency as a sealing medium by drying out, becoming brittle and/or losing its mechanical properties. These problems often cause the cork to break when pulled out of the bottle or enable wine spoilage to occur. In addition, natural cork absorbs liquids, depending on its structure and quality. This also results in breakage, while the cork is pulled out of the bottle.

Further problems or deficiencies found with natural cork is the propensity of cork worms to store or lay their eggs on the cork material, enabling the larvae to dig gullies into the cork. Consequently, enlarged apertures or channels are formed in the cork, unknown to the bottler, producing unwanted contamination. In addition to these drawbacks, cork powder and other cork impurities are often able to fall into the wine during the corking process, causing further problems for wine bottlers and unwanted surprises for the wine consumer.

In order to avoid some of the difficulties, bottlers have developed various coatings, such as paraffins, silicones and polymer materials, in an attempt to ease the movement of the cork into and out of the bottle, as well as to improve the permeability of the cork and fill imperfections in the cork surface. However, no ideal cork coating product has been developed to protect a wine corking member from all of the inherent difficulties or drawbacks of the material.

The vast majority of wine-containing bottles are currently being sold with natural cork stoppers. However, due to the inherent problems existing with natural cork, various other products have been developed to close liquid bearing containers, such as wine bottles. These other closures principally comprise structural synthetic plastics, crown cap metal stoppers, aluminum caps, plastic caps and combinations thereof.

In spite of these prior art efforts, a universally applicable closure has not been developed which satisfies all bottlers and consumer requirements. Particularly, the substantially burdensome requirements imposed upon closure means used in the wine industry have generally been employed as the standard that must be attained by a bottle closure that will be accepted by the industry. As a result of these stringent requirements, these prior art products have been incapable of satisfying the requisite needs of the industry.

In particular, one of the principal difficulties to which any bottle closure is subjected in the wine industry is the manner in which the closure is inserted into the bottle. Typically, the closure is placed in a jaw clamping member positioned above the bottle portal. The clamping member incorporates a plurality of separate and independent jaw members which peripherally surround the closure member and are movable relative to each other to compress the closure member to a diameter substantially less than its original diameter. Once the closure member has been fully compressed, a plunger moves the closure means from the jaws directly into the neck of the bottle, where the closure member is capable of expanding into engagement with the interior diameter of the bottle neck and portal, thereby sealing the bottle and the contents thereof.

In view of the fact that the jaw members must be independent of each other and separately movable in order to enable the closure member to be compressed to the substantially reduced diameter, each jaw member comprises a sharp edge which is brought into direct engagement with the closure member when the closure member is fully compressed. Depending upon the composition of the closure member, score lines are frequently formed on the outer surface of the closure member, which prevents a complete, leak-free seal from being created when the closure member expands into engagement with the bottle neck.

As a result of this sealing system, closure members other than cork have not been accepted by the wine industry, due to their inability to withstand this conventional bottling and sealing method. Furthermore, many cork sealing members also incur damage during the bottling process, resulting in leakage or tainted wine.

Another problem inherent in the wine industry is the requirement that the wine stopper must be capable of withstanding a substantial pressure build up that occurs during the storage of the wine product after it has been bottled and sealed. Due to natural expansion of the wine during hotter months, pressure builds up, imposing a burden upon the bottle stopper that must be resisted without allowing the stopper to be displaced from the bottle. As a result, the bottle stopper employed for wine products must be capable of secure, intimate, frictional engagement with the bottle neck in order to resist any such pressure build up.

A further problem inherent in the wine industry is the requirement that secure, sealed engagement of the stopper with the neck of the bottle must be achieved virtually immediately after the stopper is inserted into the neck of the bottle. During normal wine processing, the stopper is compressed, as detailed above, and inserted into the neck of the bottle to enable the stopper to expand in place and seal the bottle. However, such expansion must occur immediately upon insertion into the bottle since many processors tip the bottle onto its side or neck down after the stopper is inserted into the bottle neck, allowing the bottle to remain stored in this position for extended periods of time. If the stopper is unable to rapidly expand into secure, intimate, frictional contact and engagement with the walls of the neck of the bottle, wine leakage will occur.

Therefore, it is a principal object of the present invention to provide closure means for containers which is manufacturable from synthetic materials and effectively closes and seals any desired bottle, container, package and the like.

Another object of the present invention is to provide a synthetic closure having the characteristic features described above which is manufacturable on a continuing production basis, thus providing lower manufacturing costs compared to natural or synthetic (structured) closures and satisfying industry requirements for a removable bottle stopper which is producible substantially more economically than cork closure/stoppers.

Another object of the present invention is to provide a synthetic closure having the characteristic features described above which meets or exceeds all of the requisite physical characteristics found in natural closures or stoppers such as cork.

A further object of the present invention is to provide a synthetic closure or stopper having the characteristic features described above which is capable of simulating all of the visually aesthetic and tactile characteristics found in natural stoppers, such as cork, so as to be effectively a substitute for cork stoppers or closures for the wine industry, particularly its ends users in both appearance and feel.

Another object of the present invention is to provide a synthetic closure or stopper having the characteristic features described above which is capable of being employed in conventional bottling equipment for being inserted into a bottle container without experiencing any unwanted physical damage.

Another object of the present invention is to provide a synthetic closure or stopper having the characteristic features described above that can be substituted for a cork stopper in wine bottles, providing all of the desirable characteristics of conventional cork stoppers while also being removable from the bottle in the conventional manner without breaking.

Another object of the present invention is to provide a synthetic closure or stopper having the characteristic features described above, which is physiologically neutral, capable of being sterilized, as well as capable of being formed to visually simulate any desired classification of natural cork.

A further object of the present invention is to provide a synthetic closure or stopper having the characteristic features described above which is odorless, remains odorless in position, is tasteless, and only absorbs limited amounts of water.

Another object of the present invention is to provide a synthetic closure or stopper having the characteristic features described above which is unaffected by diluted acids and bases as well as unaffected by most oils.

Another object of the present invention is to provide a synthetic closure or stopper having the characteristic features described above which does not shrink, does not age, does not absorb mold or fungus, and resists damage from insects.

Another object of the present invention is to provide a synthetic closure or stopper having the characteristic features described above which can be mass produced on a continuing basis and eliminates any spoilage of wine due to cork taint.

Other and more specific objects will in part be obvious and will in part appear hereinafter.

SUMMARY OF THE INVENTION

By employing the present invention, all of the difficulties and drawbacks found in the prior art have been completely overcome and a mass producible, resilient, synthetic bottle closure is realized by achieving a synthetic, extruded, foamed polymer core peripherally surrounded and integrally bonded with a cooperating synthetic, extruded, outer layer. The present invention can be employed on any desired product, whether the product is a liquid, a viscous material, or a solid distributed in a bottle or container and dispensed through the open portal of the container neck.

As will become evident from the following detailed disclosure, the multi-component, multi-layer synthetic closure of the present invention may be employed as a bottle closure or stopper for any desired product. However, for the reasons detailed above, wine products impose the most burdensome standards and requirements on a bottle closure. Consequently, in order to clearly demonstrate the universal applicability of the multi-component/multi-layer synthetic closure of the present invention, the following disclosure focuses on the applicability and usability of the multi-component/multi-layer synthetic closure of the present invention as a closure or stopper for wine containing bottles. However, this discussion is for exemplary purposes only and is not intended as a limitation of the present invention.

As discussed above, a bottle closure or stopper for wine must be capable of withstanding the pressure build up due to temperature variations during storage, as well as preventing any seepage or leakage of the wine from the bottle. Furthermore, a tight seal must also be established to prevent unwanted gas exchange between ambient conditions and the bottle interior, so as to prevent any unwanted oxidation or permeation of gases from the wine to the atmosphere. In addition, the unique corking procedures employed in the wine industry also impart substantial restrictions on the bottle closure, requiring a bottle closure which is highly compressible, has high immediate compression recovery capabilities and can resist any deleterious effects caused by the clamping jaws of the bottle closure equipment.

Although prior art synthetic products have been produced in an attempt to satisfy the need for alternate bottle closures employable in the wine industry, such prior art systems have been incapable of meeting all of the stringent requirements and demands imposed upon a bottle closure for wine products. However, by employing the present invention, all of the prior art inabilities have been obviated and an effective, easily employed, mass-produced synthetic closure has been realized.

The present invention overcomes all of the prior art problems by achieving a multi-component or multi-layer synthetic closure which possesses physical properties substantially equal to or better than the physical properties found in cork material, which has caused such cork material to be the principal closure material for wine bottles. In the present invention, the prior art failings have been overcome by achieving a multi-component or multi-layer synthetic bottle closure which incorporates a central core member peripherally surrounded by and integrally bonded to an outer peripheral layer imparting additional, desirable physical characteristics to the effective outer surface of the synthetic bottle closure. By employing multi-components or multi-layers to form the synthetic bottle closure of the present invention, all of the prior art difficulties and drawbacks have been eliminated and an effective, multi-purpose, easily employed and economically mass produced synthetic closure is realized.

The multi-component/multi-layer synthetic bottle closure of the present invention comprises, as its principal component, the core member which is formed from extruded, foamed, plastic polymers, copolymers, or homopolymers. Although any known foamable plastic material can be employed in the extrusion process for developing the bottle closure of the present invention, the plastic material must be selected for producing physical properties similar to natural cork, so as to be capable of providing a synthetic closure for replacing natural cork as a closure for wine bottles.

By employing the present invention, a synthetic bottle closure is produced in a highly automated, high-tech extrusion process with product tolerances being closely maintained. As a result, various prior art difficulties encountered with cork products being out of round or having improper diameters are completely eliminated.

In addition, the multi-component/multi-layer synthetic bottle closure of the present invention is manufacturable in any desired color or with any desired markings or indicia placed on the outer surface thereof. Consequently, if desired, the synthetic bottle closure of the present invention may be manufactured with a visual appearance substantially identical to the visual appearance of a cork stopper. In addition to the natural, wood-grain cork appearance, the synthetic closure of the present invention may also be produced with any desired indicia, colors, stripes, logos, etc. formed on the surfaces thereof. These desired indicia can be formed on either the side or ends of the synthetic closure of the present invention using conventional printing techniques, embossing techniques, laser printing, laser etching, etc. as known in the printing industry.

Depending upon the sealing process employed for inserting the synthetic closure of the present invention in a desired bottle, additives, such as slip additives, may be incorporated into the outer, peripherally surrounding layer of the synthetic closure of the present invention to provide lubrication of the synthetic closure during the insertion process. In addition, other additives typically employed in the bottling industry may also be incorporated into the synthetic closure of the present invention for improving the sealing engagement of the synthetic closure with the bottle as well as reducing the extraction forces necessary to remove the synthetic closure from the bottle for opening the bottle.

In the present invention, the unique synthetic bottle closure is realized by forming an outer layer peripherally surrounding the core member in intimate, bonded, interengagement therewith. The outer, peripheral layer of the synthetic closure is formed from foam plastic material. However, the outer, peripherally surrounding layer is formed with a substantially greater density in order to impart the desired physical characteristics to the synthetic bottle closure of the present invention.

By achieving a multi-component, multi-layer synthetic bottle closure in accordance with the present invention, a bottle closure is realized which is capable of satisfying all requirements imposed thereon by the wine industry, as well as any other bottle closure/packaging industry. As a result, a synthetic bottle closure is attained that can be employed for completely sealing and closing any desired bottle for securely and safely storing the product retained therein.

The invention accordingly comprises an article of manufacture possessing the features, properties, and relation of elements which will be exemplified in the article hereinafter described, and the scope of the invention will be indicated in the claims.

THE DRAWINGS

For a fuller understanding of the nature and objects of the invention, reference should be made to the following detailed description taken in connection with the accompanying drawings, in which.

DETAILED DESCRIPTION

Figure 1:
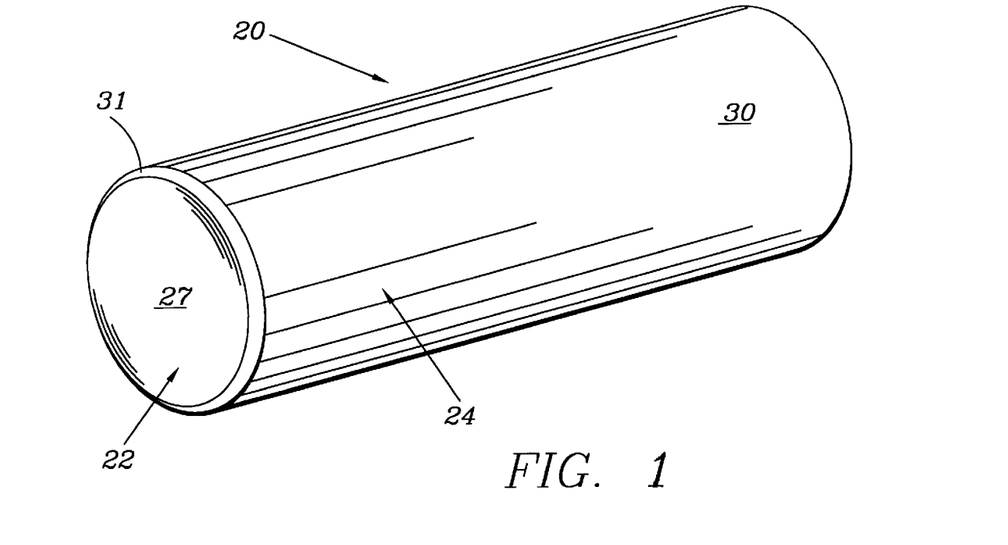
FIG. 1 is a perspective view of the multi-component or multi-layer synthetic bottle closure of the present invention.
Figure 2:
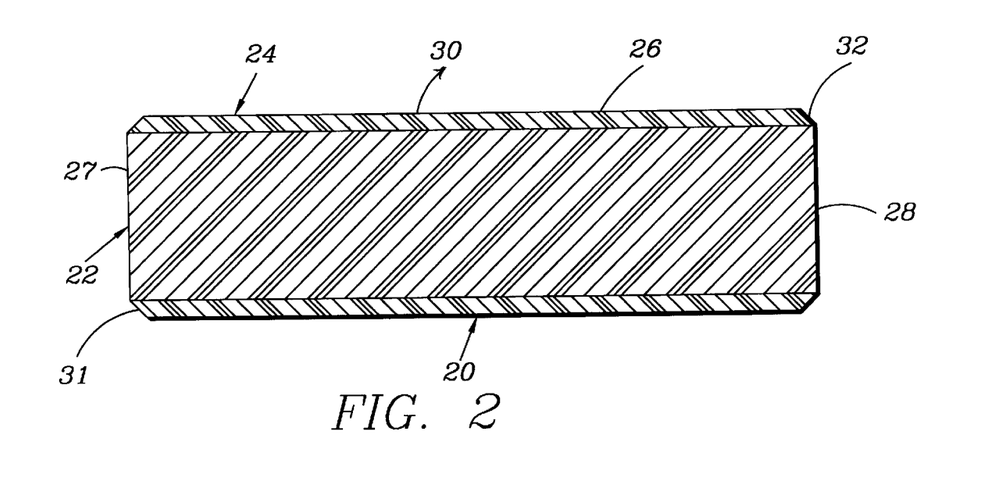
FIG. 2 is a cross-sectional side elevation view of the multi-component or multi-layer synthetic bottle closure of the present invention.

By referring to FIGS. 1 and 2, along with the following detailed disclosure, the construction of the multi-component or multi-layer synthetic bottle closure of the present invention can best be understood. In FIGS. 1 and 2, as well as in the following detailed disclosure, the multi-component or multi-layer synthetic closure of the present invention is depicted and discussed as a bottle closure for wine products. However, as detailed above, the present invention is applicable as a synthetic closure for use in sealing and retaining any desired product in any desired closure system. However, due to the stringent and difficult demands and requirements placed upon a closure for wine products, the following detailed disclosure focuses on the applicability of the synthetic bottle closure of the present invention as a closure for wine bottles. However, it is to be understood that this detailed discussion is provided merely for exemplary purposes and is not intended to limit the present invention to this particular application and embodiment.

As shown in FIG. 1, multi-component or multi-layer synthetic bottle closure 20 comprises a generally cylindrical shape having an outer diameter larger than the diameter of the portal-forming neck of the bottle into which the closure is to be inserted. In general, the overall diameter of multi-component, multi-layer synthetic closure 20 is slightly greater than the diameter of the portal into which bottle closure 20 is to be inserted. In this way, assurance is provided that secure sealed contacting interengagement is attained between synthetic closure 20 and the portal within which it is employed.

As depicted in FIGS. 1 and 2, multi-component/multi-layer synthetic bottle closure 20 comprises core member 22 and peripheral layer 24 which peripherally surrounds and is integrally bonded to core 22. In the preferred embodiment, core member 22 comprises a substantially cylindrically shaped surface 26 terminating with substantially flat end surfaces 27 and 28.

In the preferred embodiment, surrounding layer 24 is intimately bonded directly to core member 22, peripherally surrounding and enveloping surface 26 of core member 22. Peripheral layer 24 incorporates exposed surface 30, which comprises a substantially cylindrical shape and forms the outer surface of multi-component/multi-layer synthetic bottle closure 20 of the present invention, along with flat end surfaces 27 and 28.

In order to assist in assuring entry of synthetic bottle closure 20 into the portal of the bottle into which closure 20 is inserted, terminating edge 31 of peripheral layer 24 may be beveled or chamfered. Similarly, terminating edge 32 of peripheral layer 24 also may comprise a similar bevel or chamfer. Although any desired bevel or chamfered configuration can be employed, such as a radius, curve, or flat surface, it has been found that merely cutting ends 31 and 32 with an angle of about 45°, the desired reduced diameter area is provided for achieving the desired effect.

By incorporating chamfered or beveled ends 31 and 32 on synthetic bottle closure 20, automatic self-centering is attained. As a result, when synthetic bottle closure 20 is compressed and ejected from the compression jaws into the open bottle for forming the closure thereof, synthetic bottle closure 20 is automatically guided into the bottle opening, even if the clamping jaws are slightly misaligned with the portal of the bottle. By employing this configuration, unwanted difficulties in inserting bottle closure 20 into any desired bottle are obviated. However, in applications which employ alternate stopper insertion techniques, chamfering of ends 31 and 32 may not be needed.

In order to produce the attributes required for use in the wine industry, core 22 is formed from foam plastic material using a continuous extrusion process. Although other prior art systems have employed molded foamed plastic material, these processes have proven to be more costly and incapable of providing a final product with the attributes of the present invention.

In the preferred embodiment, core member 22 is formed as an extruded, medium or low density closed cell foamed plastic comprising one or more plastics selected from the group consisting of inert polymers, homopolymers, and copolymers. The preferred plastic material is preferably selected from the group consisting of polyethylenes, metallocene catalyst polyethylenes, polybutanes, polybutylenes, polyurethanes, silicones, vinyl based resins, thermoplastic elastomer, polyesters, ethylene acrylic copolymers, ethylene-vinyl-acetate copolymers, ethylene-methyl acrylate copolymers, ethylene-butyl-acrylate copolymers, ethylene-propylene-rubber, styrene butadiene rubber, ethylene-ethyl-acrylic copolymers, ionomers, polypropylenes, and copolymers of polypropylene and copolymerizable ethylenically unsaturated commoners. Furthermore, if a polyethylene is employed, it has been found that the polyethylene may comprise one or more polyethylenes selected from the group consisting of high density, medium density, low density, linear low density, ultra high density, and medium low density.

Regardless of the foamable plastic material selected for forming core member 22, the resulting extruded foam product must have a density ranging between about 100 kg/m$^3$ to 500 kg/m$^3$. Although this density range has been found to provide an effective core member, the density of the extruded foam core member 20 preferably ranges between about 200 kg/m$^3$ to 350 kg/m$^3$.

Since core member 22 is substantially closed cell in structure, additives are intermixed with the plastic material to form a closed cell foam with minute cells. The resulting core member 22 of the present invention has average cell sizes ranging from between about 0.02 millimeters to 0.50 millimeters and a cell density ranging between about 25,000,000 cells/cm$^3$ to 8,000 cells/cm$^3$. Although this cell configuration has been found to produce a highly effective product, it has been found that the most desirable product possesses an average cell size ranging between about 0.05 and 0.1 millimeters with a cell density ranging between about 8,000,000 cells/cm$^3$ to 1,000,000 cells/cm$^3$. Furthermore, in order to assure that core member 22 possesses inherent consistency, stability, functionality and capability of providing long-term performance, the cell size of core member 22 is homogeneous throughout its entire length and diameter.

In order to control the cell size of core member 22 and attain the desired cell size detailed above, a nucleating agent is employed. In the preferred embodiment, it has been found that by employing a nucleating agent selected from the group consisting of calcium silicate, talc, clay, titanium oxide, silica, barium sulfate, diamatious earth, and mixtures of citric acid and sodium bicarbonate, the desired cell density and cell size is achieved.

In this regard, it has been found that cell size and cell density is most advantageously realized in the formation of core member 22 by employing between about 0.1 and 5 parts by weight of the nucleating agent for every 100 parts by weight of the plastic foam. In this way, the desired physical characteristics of core member 22 are realized along with the desired control of the cell size and cell density. This leads to product consistency currently not available with natural and synthetic materials.

As is well known in the industry, a blowing agent is employed in forming extruded foam plastic material. In the present invention, a variety of blowing agents can be employed during the extruded foaming process whereby core member 22 is produced. Typically, either physical blowing agents or chemical blowing agents are employed. Suitable blowing agents that have been found to be efficacious in producing the core member of the present invention comprise one or more selected from the group consisting of: Aliphatic Hydrocarbons having 1–9 carbon atoms, Halogenated Aliphatic Hydrocarbons having 1–9 carbon atoms and Aliphatic alcohols having 1–3 carbon atoms. Aliphatic Hydrocarbons include Methane, Ethane, Propane, n-Butane, Isobutane, n-Pentane, Isopentane, Neopentane, and the like. Among Halogenated Hydrocarbons and Fluorinated Hydrocarbons they include Methyl-fluoride, Perfluoromethane, ethyl Fluoride, 1,1-Difluoroethane(HFC-152a), 1,1,1-Trifluoroethane(HFC 430a), 1,1,1,2-Tetrafluoroethane(HFC 134a), Pentafluoroethane, Perfluoroethane, 2,2-Difluoropropane, 1,1,1-Trifluoropropane, Perfluoropropane, Perfluorobutane, Perfluorocyclobutane. Partially Hydrogenated Chlorocarbon and Chlorofluorocarbons for use in this invention include Methyl Chloride, Methylene Chloride, Ethyl Chloride, 1,1,1-Trichlorethane, 1,1-Dichloro1-Fluoroethane(HCFC-141b), 1-Chloro1, 1-Difluoroethane (HCFC142b), 1,1-Dichloro-2,2,2-Trifluoroethane(HCFC-123) and 1-Chloro-1,2,2,2-Tetrafluoroethane(HCFC124). Fully Halogenated Chlorofluorocarbons include Trichloromonofluoromenthane(CFC11), Dichlorodifluoromenthane(CFC12), Trichlorotrifluoroethane(CFC113), Dichlorotetrafluoroethane(CFC114), Chloroheptafluoropropane, and Dichlorohexafluoropropane. Fully Halogenated Chlorofluorocarbons are not preferred due to their ozone depiction potential. Aliphatic alcohols include Methanol, Ethanol, n-Propanol and Isopropanol. Suitable inorganic blowing agent is useful in making the foam of the present invention include carbon dioxide, nitrogen, carbon, water, air, nitrogen, helium, and argon.

Chemical blowing agents include Azodicarbonamic Azodiisobutyro-Nitride, Benzenesulfonhydrazide, 4,4-Oxybenzene Sulfonylsemicarbazide, p-Toluene Sulfonylsemi-carbazide, Barium Azodicarboxlyate, N,N'-Dimethyl-N,N'-Dinitrosoterephthalamide and Trihydrazino-triazine.

Preferably, in order to produce the desired product, the blowing agent is incorporated into the plastic melt in a quantity ranging between about 0.005% to 10% by weight of the weight of the plastic material.

As detailed above, either a physical blowing agent or a chemical blowing agent can be employed as part of the extrusion process for forming core member 22 of the present invention. However, it has been found that the selection of a physical blowing agent is preferred since physical blowing agents allow core member 22 of synthetic bottle closure 20 to be achieved with a lower density, which is closer to natural cork.

In this regard, a blowing agent which is inert is preferred. Although any desired inert blowing agent may be employed, the blowing agent is preferably selected from the group consisting of nitrogen, carbon dioxides, water, air, nitrogen, helium, and argon. In addition, hydrocarbons can be employed as the blowing agent which are preferably selected from the group consisting of butane, isobutene, pentane, isopentane and propane.

In addition to attaining core member 22 which possesses a construction with physical characteristics similar to nature cork, multi-component or multi-layer synthetic bottle closure 20 of the present invention also comprises peripheral layer 24. Peripheral layer 24 is of particular importance in attaining synthetic bottle closure 20 which is capable of meeting and exceeding all of the difficult requirements imposed upon a closure or stopper for the wine industry.

As discussed above, the wine industry incorporates corking machines which incorporate a plurality of cooperating, movable jaws which move simultaneously to compress the bottle stopper to a diameter substantially smaller than the diameter of the portal into which the stopper is inserted. Then, once fully compressed, the stopper is forced out of the jaws directly into the bottle, for expanding and immediately closing and sealing the bottle.

Due to the operation of the cooperating jaws which are employed to compress the stopper for insertion into the bottle, sharp edges of the jaw members are forced into intimate contact with the outer surface of the stopper. Although cork material has been successful in resisting permanent damage from the jaw edges in most instances, other prior art synthetic stoppers have been incapable of resisting these cutting forces. As a result, longitudinal cuts, score lines or slits are formed in the outer surface of the stopper, enabling liquid to seep from the interior to the exterior of the bottle.

Multi-component/multi-layer synthetic bottle closure 20 of the present invention eliminates this inherent problem, existing with prior art cork and synthetic closures, by incorporating peripheral layer 24 which surrounds and envelopes substantially the entire outer surface 26 of core member 22. In addition, by forming peripheral layer 24 from high density, rugged, score-resistant material, synthetic bottle closure 20 overcomes all of the prior art difficulties and achieves a bottle closure having physical properties equal to or superior to conventional cork material.

In the preferred embodiment, peripheral layer 24 is formed from plastic material identical or similar to the plastic material employed for core member 22. However, as detailed below, the physical characteristics imparted to peripheral layer 24 differ substantially from the physical characteristics of core member 22.

In the preferred construction, peripheral layer 24 comprises a thickness ranging between about 0.1 and 5 millimeters and, more preferably, between about 0.5 and 2 millimeters. Although these ranges have been found to be efficacious to producing synthetic bottle closure 20 which is completely functional and achieves all of the desired goals, the preferred embodiment for wine bottles comprises a thickness of 1 millimeter.

In producing peripheral layer 24 and achieving the desired tough, score and mar-resistant surface for core member 22, peripheral layer 24 preferably comprises a density ranging between about 300 kg/m$^3$ to 1,500 kg/m$^3$. Most ideally, it has been found that the density of peripheral layer 24 ranges between about 750 kg/m$^3$ to 1,000 kg/m$^3$.

In accordance with the present invention, multi-component or multi-layer synthetic bottle closure 20 of the present invention must be formed with peripheral layer 24 intimately bonded to substantially the entire surface 26 of core member 22. If any large unbonded areas exist, flow paths for gas and liquid could result. Consequently, secure, intimate, bonded interengagement of peripheral layer 24 with core member 22 is required for attaining a bottle closure for the wine industry.

In order to achieve this integral bonded interconnection between peripheral layer 24 and core member 22, peripheral layer 24 is formed about core member 22 in a manner which assures intimate bonded engagement. Preferably, the desired secure, intimate, bonded, interengagement is attained by simultaneous co-extrusion of core member 22 and peripheral layer 24 or by applying peripheral layer 24 to core member 22 after core member 22 has been formed. By employing either process, intimate bonded interengagement of peripheral layer 24 to core member 22 is attained.

By using equipment well known in this industry, multi-component/multi-layer synthetic bottle closure 20 of the present invention can be produced by co-extruding core member 22 simultaneously with peripheral layer 24 to provide a final product wherein peripheral layer 24 is intimately bonded to core member 22 in a single, continuous operation. If co-extrusion process is employed, once the continuous elongated co-extruded layers forming synthetic bottle closure 20 have been completely formed and are ready for final processing, the elongated dual component material produced is cut to the precise length desired for forming synthetic bottle closures 20.

After each bottle closure 20 has been formed with the desired length, the desired chamfer, if needed, is formed at each end of peripheral layer 24 in order to provide the benefits detailed above. Once the chamfer or radius has been achieved, synthetic bottle closure 20 is ready for distribution to the desired consumer, unless appropriate coatings and/or printing will be applied.

In the alternate construction, core member 22 is formed as an elongated, continuous, extruded foam product and is allowed to cool until ready for subsequent processing. Then, whenever desired, the continuous elongated length forming core member 22 is fed through a cross-head machine which enables peripheral layer 24 to be formed and positioned in the desired location peripherally surrounding core member 22 in intimate bonded interengagement therewith. Once the dual component product has been completed, the elongated length of material is cut to the desired length for forming bottle closure 20, as detailed above, with the desired chamfer or radius being formed in peripheral layer 24, attaining the final product.

As discussed above, intimate bonded interengagement of peripheral layer 24 to core member 22 is required for providing a synthetic bottle closure 20 capable of being used in the wine industry. In this regard, although it has been found that the processes detailed above provide secure intimate bonded interengagement of peripheral layer 24 to core member 22, alternate layers or bonding chemicals can be employed, depending upon the particular materials used for forming core member 22 and peripheral layer 24.

If desired, well known bonding agents or tie layers can be employed on the outer surface of core member 22 in order to provide secure intimate bonded interengagement of peripheral layer 24 therewith. If a tie layer is employed, the tie layer would effectively be interposed between core member 22 and peripheral layer 24 to provide intimate bonded interengagement by effectively bonding peripheral layer 24 and core member 22 to the intermediately positioned tie layer. However, regardless of which process or bonding procedure is employed, all of these alternate embodiments are within the scope of the present invention, providing a synthetic bottle closure capable of overcoming all of the prior art difficulties and drawbacks.

As detailed above, a wide variety of foamable plastic materials can be employed to produce the extruded multi-component, multi-layer synthetic bottle closure 20 of the present invention. Although each of the plastic materials detailed above can be employed for both core member 22 and peripheral layer 24, the preferred plastic material for forming both core member 22 and peripheral layer 24 comprises one or more selected from the group consisting of medium density polyethylenes, low density polyethylenes, metallocene catalyst polyethylenes, polypropylenes, polyesters, ethylene-butyl-acrylate copolymers, vinyl-acetate copolymers, and ethylene-methyl acrylate copolymers.

It has also been discovered that the outer peripheral layer or skin layer 24 may comprise a thermoplastic elastomer composition which differs from the thermoplastic elastomer composition employed for the core member. In this regard, the outer peripheral layer 24 may comprise one or more selected from the group consisting of styrenic block copolymers, such as styrene-ethylene-butylene-styrene (SEBS), styrene-butadiene-styrene (SBS), and other similar formulations. These thermoplastic elastomers are available from Shell under the tradename Kraton.

In addition, peripheral layer 24 may be formed from thermoplastic olefinic elastomers such as petrothene TPOE, thermoplastic urethanes (TPU), thermoplastic polyesters, and other similar product formulas.

The particular composition employed for peripheral layer 24 is selected to withstand the compression forces imposed thereon by the jaws of the corking machine. However, many different polymers are able to withstand these forces and, as a result, can be employed for peripheral layer 24. In this regard, the principal feature of the present invention is not the material used for layer 24. Instead, the present invention centers on the discovery that a solid or foamed plastic-based outer peripheral layer or skin is securely affixed about a foamed plastic center core, producing a multi-layer synthetic closure which is able to withstand the forces of a cork machine. The ability of the present invention to withstand these forces, without product leakage, exists even if cork dust filler is present between the core and the peripheral layer.

In order to form synthetic bottle closure 20 with all of the desirable inherent physical and chemical properties, it has been found to be most advantageous to employ metallocene catalyst polyethylenes, either independently or in combination with one selected from the group consisting of low density polyethylenes, medium density polyethylenes, and medium low density polyethylenes. These materials are preferably employed for both core member 22 and peripheral layer 24.

In order to attain the desired physical properties for each of the layers forming multi-component/multi-layer synthetic closure 20, core member 22 preferably comprises between about 0% and 75% by weight of metallocene catalyst polyethylene, and between about 25% and 100% by weight of one or more polyethylenes as detailed above. In forming peripheral layer 24, it has been found that the composition preferably comprises between about 25% and 100% metallocene catalyst polyethylene and between 0% and 75% by weight of one or more selected from the group consisting of medium density polyethylene, medium low density polyethylene, and low density polyethylene.

In order to demonstrate the efficacy of the present invention, a plurality of samples of multi-component/multi-layer synthetic bottle closures 20, manufactured in accordance with the present invention, were produced and tested. These sample products were produced by employing metallocene catalyst polyethylene and low density polyethylene intermixed with each other in the ranges detailed above to form core member 22. In forming core member 22 of each sample product, the two compounds were intermixed and formed using conventional foam extrusion equipment. In forming peripheral layer 24, 100% by weight of metallocene catalyst polyethylene was employed.

In the forming process, peripheral layer 24 was foamed in the extrusion equipment peripherally surrounding core member 22 and being intimately bonded thereto. The resulting product was cut in lengths suitable for forming bottle closure 20, followed by a chamfer being formed in edges 31 and 32. The resulting closures were then employed in a plurality of tests to prove the ability of the present invention to overcome the prior art difficulties and provide a bottle closure which is equivalent to or better than the properties and performance characteristics provided by cork.

In producing the synthetic bottle closure 20 of the present invention in the manner detailed above, blowing agents and nucleating agents detailed above were employed as previously disclosed. These additives were employed using standard procedures well known in the foam extrusion process.

In order to demonstrate the ability of the synthetic bottle closure 20 of the present invention to possess physical properties similar to or better than natural cork, a comparative analysis of natural cork and synthetic closure 20 of the present invention was made using the sample products produced as detailed above. By referring to Table I, the ability of the synthetic bottle closure 20 of the present invention to achieve physical properties that are equivalent to or better than natural cork is clearly demonstrated.

TABLE I

| Property | Natural Cork | Synthetic Closure |
|---|---|---|
| Compressive strength to 15.5 mm radial Max load (LBF) | 591 | 581 |
| Compressive strength to 15.5 mm Radial Max stress (psi) | 113.6 | 126.4 |
| Compressive strength (36%) rectangular Max stress (psi) | 280.4 | 300.4 |
| Compressive recovery instantaneous (%) | 94.79 | 94.12 |
| Compressive recovery 1 hour (%) | 98.33 | 97.88 |
| Compressive recovery 24 hours (%) | 99.58 | 98.35 |

In order to demonstrate the ability of the multi-component/multi-layer, synthetic bottle closure of the present invention to meet or exceed the physical qualities possessed by natural cork when employed as a bottle closure or stopper for wine, numerous tests were conducted directly comparing the synthetic bottle closure of the present invention to natural cork stoppers. However, natural cork varies in quality from an ultra low quality to an ultra high quality. Typically, the quality of the cork is determined by price in accordance with the following schedule:

ultra low quality corks are below $90 per 1,000 pieces low quality natural corks range from $95 to $120 per 1,000 pieces medium quality natural corks range from $125 to $180 per 1,000 pieces high quality natural corks range from $175 to $250 per 1,000 pieces ultra high quality natural corks are above $250 per 1,000 pieces As detailed below, most test comparisons were made using medium quality natural cork. In this regard, since the price for medium quality natural cork ranges between about $125 to $180 per 1,000 pieces, the samples tested in the following comparisons were made using medium quality natural cork found in the highest price range for this category.

Before being used as a test sample, each of the natural cork stoppers were inspected to assure high quality and eliminate obvious flaws that might exist. As a result, all of the natural cork stoppers employed in these tests met the following standards.

Each natural cork stopper was 45 mm in length, 24 mm in diameter and, upon visual inspection, had no visual or functional flaws. Furthermore, natural cork stoppers tested to possess a maximum of three very shallow or narrow lenticels, and were free of dust particles. In addition, the stoppers had no holes or pores in excess of 2 mm, possessed a maximum of one crack, which was classified as being very tight and less than 8% of the cork length. Furthermore, no worm activity was visible, as well as no bellyspots or greenwood. The ends of each cork were relatively clean and possessed very little chance of chipping on the edges. Finally, no cracks originated from the ends, and growth rings were uniform and substantially equidistant.

In conducting the following tests, a supply of synthetic bottle closure of the present invention were manufactured in the manner detailed above. In addition, a separate supply of each different type of natural cork stoppers was established.

In conducting each test, a plurality of samples were randomly selected from each supply and tested in accordance with the procedures detailed herein. The results for each test were computed and are provided in Tables II, III, IV, and V.

Compression Tests

In this test, the force required to compress each closure or stopper from its original diameter to a diameter of 15.5 mm was determined. In conducting this test, 6 random samples were selected from the supply of medium quality natural cork stoppers and six random samples were selected from the supply of synthetic bottle closures of the present invention manufactured in the manner detailed above.

Each sample was separately positioned on a radial compression device, which was installed onto an Instron 1011 Material Tester. When positioned on the radial compression device, each sample was compressed from its normal diameter, typically 24.0 mm, to a compressed diameter of 15.5 mm. The force value required for compressing each test sample was recorded. The overall average resulting force values for each sample type were computed and are reported in Table II as the maximum compression force in pounds.

samples were selected from the supply of synthetic bottle closures of the present invention manufactured in the manner detailed above.

The diameter of each sample was recorded. Then, following the method detailed in ASTM Method D-3575 Suffix B, each sample was linearly compressed to 50% of its original diameter and maintained at this compression for 22 hours. The test device consisted of two flat, surface ground plates capable of securing the samples at the desired 50% compression. At the end of the 22 hours, the samples were allowed to recover for 2 hours, after which the diameter of each sample was measured in the compression direction and the measurements recorded.

The compression set was determined for each sample using the following formula: Percent Compression Set= 100−[(diameter after compression÷original diameter)×100]. The overall average percent compression set for each sample type was determined by averaging the individual values calculated for each test sample. This overall average result is provided in Table II.

Extraction Force

Another comparative test which was conducted was an extraction force test to determine the amount of force

TABLE II

Compression Tests

| Sample Test | Max. Radial Compression Force to 15/5 mm (LBF) | Compression Recovery Instantaneous | Compression Recovery After 15 min. | Compression Recovery After 1 Hour | Compression Recovery After 24 Hrs. | Compression Set |
|---|---|---|---|---|---|---|
| Synthetic Closure | 481.7 | 94.90% | 97.45% | 97.77% | 98.09% | 17.49% |
| Natural Cork Medium Quality | 483.75 | 93.86% | 96.44% | 96.72% | 97% | 28.78% |

Another compression test was conducted to determine the recovery rate for the closures or stoppers at different time intervals. In conducting this test, six random samples were selected from the supply of synthetic bottle closures of the present invention, manufactured in the manner detailed above, and six random samples were selected from the supply of medium quality natural cork closures. This test was designed to determine the recovery rate for each of the closures after compression to 13.0 mm and release therefrom.

In conducting this test, each of the selected samples was positioned in a commercially available hand corker having a capability to compress the closures from their original diameter to a diameter of 13.0 mm, and then allow each of the stoppers to be released by pushing them out of the compression jaws with a plunger. In each case, the original diameter of each sample was recorded. Thereafter, the diameter of each test sample was recorded immediately after being ejected from the compression jaws, fifteen minutes after ejection, one hour after ejection, and twenty-four hours after ejection. The percent recovery for each measurement was calculated by employing the following formula:

$$\% \text{ Recovery} = \frac{Dm}{Do} \times 100$$

where Dm is the measured diameter at the different time interval and Do is the original diameter. The average percent recovers was computed for each sample type and the results are shown in Table II.

The final compression test conducted was a determination of the compression set, which is a determination of the ability of each stopper to recover after being exposed to a prolonged 50% linear compression. In conducting this test, three random samples were selected from the supply of medium quality natural cork stoppers and three random required to extract each type of closure from a properly corked bottle. In conducting this test, six random samples were selected from the supply of medium quality natural corks, and six random samples selected from the supply of synthetic bottle closures of the present invention manufactured in the manner detailed above. The device used for testing was an Instron Model 1011 Material Tester, which was outfitted with a corkscrew fixture to perform the extraction and measure the forces.

In conducting this test, each of the test samples were inserted into a 750 ml bottle filled with water to the 55 mm fill level, using the procedure described in *Practical Aspects of Wine Corkage* by Jean Michel Riboulet and Christian Alegoet, Bourgogne Publications, Chaintre, France, pages 148–157. The corkscrew was inserted into the corked bottle and the cork removed, while recording the forces required to extract the cork. For each sample, both the maximum force and the average force required for its extraction was recorded. In Table III, the overall average for both the maximum extraction force and the average extraction force for each sample type is detailed.

TABLE III

Extraction Force

| Sample Type | Maximum Extraction Force (lbs) | Average Extraction Force (lbs) |
|---|---|---|
| Synthetic Closure | 44.50 | 25.89 |
| Natural Cork—Medium Quality | 39.80 | 23.05 |

Sealing Behavior

The next performance test conducted was a sealing behavior test which determines the ability of the closure or stopper to resist compromising the integrity of the seal when the closure is subjected to elevated pressures inside the bottle. In conducting this test, six random samples were selected from the supply of high quality natural corks, six random samples were selected from the supply of medium quality natural corks, six random samples were selected from the supply of low quality natural corks, and six random samples were selected from the supply of the synthetic bottle closure of the present invention, manufactured in the manner detailed above. The device used for testing each of the samples was a conventional 750 ml bottle, which was modified to allow the pressure in the bottle to be regulated from 0 psi to 30 psi.

In conducting this test, each sample closure was inserted into a bottle and allowed to recover in the bottle for one hour prior to testing. Thereafter, the samples were inverted and connected to the pressure device. The samples were subjected to four elevated pressure levels for two-minutes at each level. The pressure levels were 10 psi, 15 psi, 22.5 psi and 30 psi. At the end of the two-minute interval at each pressure level, each sample was individually observed and rated on the following scale:

10=closure did not move from its original location and no dampness detected

8=closure moved from its original location without popping out of the bottle and no dampness detected 6=closure did not move from its original location and dampness was detected, but no dripping 4=closure moved from its original location without popping out of the bottle and no dampness detected, but no dripping 2=closure did not move from its original location and drips 1=closure moved from its original location without popping out of the bottle and drips 0=closure popped out of bottle −40=test pressure is lost The evaluations for each sample were recorded at each interval and the results for each sample at the four different test intervals were totalled. Any sample receiving a total score less than 40 was considered a failure. With six closures being tested of each sample type, a total score of 240 represented the maximum score attainable and was employed as the standard for passing this test. When fully evaluated, the synthetic bottle closure of the present invention, the high quality natural cork stoppers, and the medium quality natural cork stoppers all scored 240 points, thereby passing this test. The low quality natural cork stoppers received a total point score of 224, resulting in a failure of this test.

Temperature Test

The next performance test was a temperature test to compare the ability of the closures to resist any compromising sealing integrity at elevated temperatures. In conducting this test, two random samples were selected from the supply of medium quality natural cork and two random samples were selected from the synthetic bottle closure of the present invention manufactured in the manner detailed above. 750 ml bottles were filled with water to a level of 55 mm from the bottle lip and 63 mm from the bottle lip. This filling was done in accordance with the disclosure found in *Practical Aspects of Wine Corkage,* as detailed above.

Each sample type was inserted into both the 55 mm and 63 mm fill levels and when sealed in position, the bottle was placed horizontally in an oven at 38° C. for twenty-four hours. The samples were observed after twenty-four hours for leakage and movement of the closure. Any leakage or movement was considered a failure. The results of this test are shown in Table IV.

TABLE IV

| Sample | 55 mm Fill Level | | 63 mm Fill Level | |
| --- | --- | --- | --- | --- |
| | Leaking | Movement | Leaking | Movement |
| Natural Cork—Medium Quality—1 | Fail | Pass | Fail | Pass |
| Natural Cork—Medium Quality—2 | Fail | Pass | Fail | Pass |
| Synthetic Closure—1 | Pass | Fail | Pass | Pass |
| Synthetic Closure—2 | Pass | Fail | Pass | Pass |

Aroma Absorption

In the next performance test, the ability of the closures to resist absorption of aromas were performed. In this test, eighteen random samples were selected from the supply of medium quality natural corks and eighteen random samples were selected from the supply of synthetic bottle closures of the present invention manufactured in the manner detailed above. Each of the closures were individually soaked in a white wine solution for a period of 24 hours. After soaking, each wine solution sample was analyzed for retained odors. The overall results revealed the synthetic closures of the present invention had an aroma which was described as very consistent, neutral, and light woody. The medium quality natural cork closures had aromas which were described as vanilla, woody, cardboardy, and papery.

Capillarity

Another test performed on the closures was a capillarity test, which is designed to determine the ability of the materials tested to resist the absorption of red wine above the level of the hydrostatic head of the liquid. In conducting this test, three random samples were selected from the supply of medium quality natural cork stoppers and three random samples were selected from the supply of synthetic bottle closures of the present invention manufactured in the manner detailed above. The device used for testing was a flat-bottom vessel capable of holding red wine at a constant level of 5 mm.

Each of the samples were vertically positioned on the flat-bottom vessel submerged in 5 mm of wine for twenty-four hours. Thereafter, the samples were removed from the holding tank and blotted dry. Then, the length of the wine stain on the exterior of each of the closures was measured and recorded in millimeters. Due to variations in the rate of absorbency over the cross-section of the closures, particularly the natural cork closures, the maximum capillarity or maximum length of the wine stain was measured as well as the overall average capillarity or wine stain length. The overall average of each of these results for each of the sample types tested is shown in Table V.

TABLE V

| | Capillarity | |
| --- | --- | --- |
| Sample | Maximum Capillarity | Average Capillarity |
| Synthetic Closure | 0.00 | 0.00 |
| Natural Cork—Medium Quality | 20.03 | 6.60 |

Water Absorption

Another test conducted was a water absorption test to compare the amount of water absorbed by each of the sample types. In conducting this test, three random samples were selected from the supply of medium quality natural cork stoppers and three random samples were selected from the synthetic bottle closures of the present invention manufactured in the manner detailed above. The water absorption test conducted was in compliance with ASTM Method D-570. In conducting this test, the device used was a water-tight vessel capable of holding enough water to completely submerse each sample. The vessel also contained a screen with enough weight to submerge all of the samples simultaneously.

Each sample was weighed to the nearest 1/10,000 of a gram and submerged in the tank for 24 hours. Thereafter, the samples were removed from the tank and blotted dry. Then, the samples were weighed to the nearest 1/10,000 of a gram and the amount of water absorbed determined as the difference between the weight of the sample before and after submersion. The water absorption for each sample was computed in accordance with the following formula:

$$\text{Water Absorption} = \frac{\text{Weight of Water}}{\text{Original Weight of Sample}} \times 100$$

The resulting average absorbency for the synthetic bottle closure of the present invention was 0.27%, while the average of water absorbency for the medium quality natural cork stopper was 13.06%.

As is evident from a review of the test results detailed above, the multi-component/multi-layer synthetic bottle closure of the present invention has been clearly demonstrated as possessing physical characteristics which are either equivalent to or better than the physical characteristics possessed by bottle stoppers formed from natural cork. As a result of these test procedures, as well as the foregoing detailed disclosure regarding the synthetic bottle closure of the present invention, it is immediately apparent that all of the inherent problems, difficulties, and drawbacks existing with natural cork stoppers have been completely overcome by the present invention, and a uniform, consistent, easily manufactured and comparatively inexpensive synthetic bottle closure has been achieved which can be employed for sealing products in bottles, such as wine, without incurring any loss or unwanted change in the physical characteristics of the product.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly, it is to be understood that the in said claims, ingredients or compounds recited in the singular are intended to include compatible mixtures of such ingredients wherever the sense permits.

Having described our invention, what we claim is new and desire to secure by Letters Patent is:

1. A stopper or closure for a fluid product retaining container constructed for being inserted and securely retained in a portal forming neck of the container, said stopper/closure comprising:
   A. an elongated, solid cylindrically shaped member dimensioned for insertion in the portal of the neck of the fluid product retaining container for closing and sealing the fluid product in the container;
   B. comprising at least two components concentrically mounted to each other and integrally bonded together in a manner which prevents passage of the fluid therebetween;
   C. said first component comprising an elongated, solid, cylindrically shaped core member formed from extruded foamed plastic material comprising a density ranging between about 100 kg/m$^3$ to 500 kg/m$^3$ and constructed for sealing the fluid product retained in the container and preventing transfer of the fluid product from the container prior to removal; and
   D. said second component
      a. peripherally surrounding the cylindrical surface of the first component,
      b. comprising foamed plastic material formed by extrusion in peripheral surrounding, intimate, bonded engagement with the cylindrical surface of the first component and comprising a density ranging between about 300 kg/m$^3$ and 1,500 kg/m$^3$, and
      c. having an exposed surface constructed for frictionally engaging a surface of the portal formed in the neck of the container and being securely engaged therewith until forcibly removed therefrom, sealing the fluid product in the container and resisting all forces generated by the fluid product when retained in said container;
   whereby a multi-layer/multi-component synthetic closure is attained which is capable of completely sealing any desired fluid product in a container, retaining the product in the container for any desired length of time without any degradation of the fluid product or degradation of the closure.

2. The synthetic closure/stopper defined in claim 1, wherein the cylindrically shaped core member is further defined as comprising substantially flat terminating surfaces forming the opposed ends of said cylindrically shaped core member and said peripheral layer is further defined as enveloping substantially the entire cylindrical surface of the core member.

3. The synthetic closure/stopper defined in claim 1, wherein the plastic material forming the core member is further defined as comprising medium density or low density, closed cell, foamed plastic comprising one or more selected from the group consisting of inert polymers, homopolymers, and copolymers.

4. The synthetic closure/stopper defined in claim 3, wherein said closed cell foam plastic material is further defined as comprising at least one selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, ethylene-butyl-acrylate copolymers, ethylene-propylene-rubber, styrene butadiene rubber, ethylene-ethyl-acrylic copolymers, ionomers, polypropylenes, and copolymers of polypropylene and copolymerizable ethylenically unsaturated commoners.

5. The synthetic closure/stopper defined in claim 3, wherein said closed cell, foamed plastic material is further defined as comprising one or more polyethylenes selected from the group consisting of high density, medium density, low density, linear low density, ultra high density, and medium low density.

6. The synthetic closure/stopper defined in claim 1, wherein said core member is further defined as comprising a density ranging between about 100 kg/m$^3$ to 500 kg/m$^3$.

7. The synthetic closure/stopper defined in claim 6, wherein said core member further comprises a density ranging between about 200 kg/m$^3$ to 350 kg/m$^3$.

8. The synthetic closure/stopper defined in claim 6, wherein said core member is further defined as comprising closed cells having an average cell size ranging from between about 0.02 millimeters to 0.50 millimeters and a cell density ranging between about 8,000 cells/cm$^3$ to 25,000,000 cells/cm$^3$.

9. The synthetic closure/stopper defined in claim 8, wherein said core member is further defined as comprising cell size ranging between about 0.05 mm and 0.1 mm and a cell density ranging between about 1,000,000 cells/cm$^3$ to 8,000,000 cells/cm$^3$.

10. The synthetic closure/stopper defined in claim 3, wherein said peripheral layer is further defined as being formed from foam plastic material comprising one or more selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methylacrylate copolymers, ethylene-butyl-acrylate copolymers, ethylene-propylene-rubber, styrene butadiene rubber, ethylene-ethyl-acrylic copolymers, ionomers, polypropylenes, and copolymers of polypropylene and copolymerizable ethylenically unsaturated commoners.

11. The synthetic closure/stopper defined in claim 10, wherein said peripheral layer is further defined as comprising a thickness ranging between about 0.1 mm and 5 mm.

12. The synthetic closure/stopper defined in claim 11, wherein said peripheral layer is further defined as comprising a thickness ranging between about 0.5 mm and 2 mm.

13. The synthetic closure/stopper defined in claim 10, wherein said peripheral layer is further defined as comprising a tough, score and mar resistant surface and a density ranging between about 300 kg/m$^3$ and 1,500 kg/m$^3$.

14. The synthetic closure/stopper defined in claim 13, wherein the density of the peripheral surface is further defined as comprising between about 750 kg/m$^3$ and 1,000 kg/m$^3$.

15. The synthetic closure/stopper defined in claim 1, wherein the core member and the peripheral layer are both further defined as being formed from one or more foamable plastic materials selected from the group consisting of medium density polyethylenes, low density polyethylenes, metallocene catalyst polyethylenes, polypropylenes, polyesters, ethylene-butyl-acrylate copolymers, vinyl-acetate copolymers, and ethylene-methyl acrylate copolymers.

16. The synthetic closure/stopper defined in claim 15, wherein said core member and said peripheral layer are further defined as being formed from metallocene catalyst polyethylenes either independently or in combination with one or more selected from the group consisting of low density polyethylenes, medium density polyethylenes, and medium low density polyethylenes.

17. The synthetic closure/stopper defined in claim 16, wherein said core member is further defined as comprising:
   a. between about 0% and 75% by weight based upon the weight of the entire core member of metallocene catalyst polyethylene, and
   b. between about 25% and 100% by weight of one or more polyethylenes selected from the group consisting of medium density polyethylenes, medium low density polyethylenes, and low density polyethylenes.

18. The synthetic closure/stopper defined in claim 17, wherein said peripheral layer is further defined as comprising:
   a. between about 25% and 100% metallocene catalyst polyethylene, and
   b. between about 0% and 75% by weight of one or more polyethylenes selected from the group consisting of medium density polyethylenes, medium low density polyethylenes, and low density polyethylenes.

19. The synthetic closure/stopper defined in claim 1 wherein said core member and said peripheral layer are further defined as being formed by extrusion.

20. The synthetic closure/stopper defined in claim 19, wherein said core member and said peripheral layer are further defined as being extruded simultaneously.

21. The synthetic closure/stopper defined in claim 19, wherein said core member is further defined as being extruded separately and subsequent thereto said peripheral layer is formed in extrusion equipment peripherally surrounding and enveloping the preformed core member.

22. The synthetic closure/stopper defined in claim 19, wherein said extrusion process is further defined as incorporating one or more blowing agents selected from the group consisting of carbon dioxide, nitrogen, carbon, water, air nitrogen, helium, and argon, Azodicarbonamic Azodiisobutyro-Nitride, Benzenesulfonhydrazide, 4,4-Oxybenzene Sulfonylsemicarbazide, p-Toluene Sulfonylsemi-carbazide, Barium Azodicarboxlyate, N,N'-Dimethyl-N,N'-Dinitrosoterephthalamide, Trihydrazinotriazine, Aliphatic Hydrocarbons having 1–9 carbon atoms, Halogenated Aliphatic Hydrocarbons having 1–9 carbon atoms, Aliphatic Hydrocarbons having 1–9 carbon atoms, Aliphatic alcohols having 1–3 carbon atoms and partially Hydrogenated Chlorocarbon and Chlorofluorocarbons.

23. The synthetic closure/stopper defined in claim 22, wherein said blowing agent is further defined as comprising between about 0.005% and 10% by weight of the weight of the plastic material and comprises an inert blowing agent selected from the group consisting of nitrogen, carbon dioxide, water, air, nitrogen, helium, and argon.

24. The synthetic closure/stopper defined in claim 20, wherein a nucleating agent is employed in the extrusion process and said nucleating agent is selected from the group consisting of calcium silicate, talc, clay, titanium oxide, silica, barium sulfate, diamatious earth, and mixtures of citric acid and sodium bicarbonate.

25. The synthetic closure/stopper defined in claim 24, wherein said nucleating agent is further defined as comprising between about 0.1 and 5 parts by weight for every 100 parts by weight of the plastic material.

26. The synthetic closure/stopper defined in claim 1, wherein said peripheral layer is further defined as comprising indicia formed on the outer surface thereof.

27. The synthetic closure/stopper defined in claim 26, wherein said indicia comprises one or more selected from the group consisting of letters, symbols, colors, graphics, and wood tones.

28. A stopper or closure for a wine-retaining container constructed for being inserted and securely retained in a portal forming neck of the container, said stopper/closure comprising;
   A. an elongated, solid, cylindrically shaped member dimensioned for insertion in the portal of the neck of the wine retaining container for closing and sealing the wine in the container;
   B. comprising two components concentrically mounted to each other and integrally bonded together in a manner which prevents passage of any fluid therebetween;
   C. said first component comprising an elongated, solid, cylindrically shaped core portion formed from extruded foamed plastic material, comprising a density ranging between about 100 kg/m$^3$ and 500 kg/m$^3$ and constructed for sealing the wine retained in the container and preventing transfer of the wine and any gases produced thereby out of the container prior to removal thereof; and D. said second component
   a. peripherally surrounding the cylindrical surface of the first component,
   b. comprising foamed plastic material formed by extrusion in peripheral surrounding, intimate, bonded engagement with the cylindrical surface of the first component comprising a density ranging between about 300 kg/m$^3$ and 1,500 kg/m$^3$, and
   c. having an exposed surface and comprising a tough, score and mar resistant construction for resisting the compressive force of a corking machine employed for inserting the closure/stopper into the portal of a wine retaining bottle, and constructed for frictionally engaging a surface of the portal formed in the neck of the container and being securely engaged therewith until forcibly removed therefrom, sealing the wine in the container and resisting all forces generated by the wine when retained in said container.

29. The synthetic closure/stopper defined in claim 1, wherein said peripheral layer is further defined as being formed from extruded plastic material comprising one or more selected from the group consisting of styrenic block copolymers, thermoplastic olefinic elastomers, thermoplastic urethanes and thermoplastic polyesters.

30. The synthetic closure/stopper defined in claim 29, wherein the peripheral layer comprises one or more styrene block copolymers selected from the group consisting of styrene-ethylene-butylene styrene and styrene-butadiene styrene.

* * * * *